US008588559B2

(12) United States Patent
Wu et al.

(10) Patent No.: US 8,588,559 B2
(45) Date of Patent: Nov. 19, 2013

(54) OPTICAL COUPLER MODULE HAVING OPTICAL WAVEGUIDE STRUCTURE

(75) Inventors: Mao-Jen Wu, Taoyuan (TW);
Hsiao-Chin Lan, Taoyuan (TW);
Yun-Chih Lee, Taoyuan (TW);
Chia-Chi Chang, Taoyuan (TW);
Hsu-Liang Hsiao, Taoyuan (TW);
Chin-Ta Chen, Taoyuan (TW);
Bo-Kuan Shen, Taoyuan (TW);
Guan-Fu Lu, Taoyuan (TW);
Yan-Chong Chang, Taoyuan (TW);
Jen-Yu Chang, Taoyuan (TW)

(73) Assignee: National Central University, Taoyuan (TW)

( * ) Notice: Subject to any disclaimer, the term of this patent is extended or adjusted under 35 U.S.C. 154(b) by 180 days.

(21) Appl. No.: 13/225,625

(22) Filed: Sep. 6, 2011

(65) Prior Publication Data
US 2012/0057822 A1    Mar. 8, 2012

(30) Foreign Application Priority Data

Sep. 3, 2010   (TW) ................................ 99129971 A

(51) Int. Cl.
*G02B 6/12* (2006.01)
*G02B 6/26* (2006.01)
*G02B 6/36* (2006.01)
*G02B 6/42* (2006.01)

(52) U.S. Cl.
USPC ................... 385/14; 385/36; 385/38; 385/47; 385/89

(58) Field of Classification Search
USPC ...................... 385/14, 36, 38, 47, 89
See application file for complete search history.

(56) References Cited

U.S. PATENT DOCUMENTS

| 5,125,054 | A | * | 6/1992 | Ackley et al. | 385/49 |
| 5,249,245 | A | * | 9/1993 | Lebby et al. | 385/89 |
| 5,265,184 | A | * | 11/1993 | Lebby et al. | 385/132 |
| 5,325,451 | A | * | 6/1994 | Hartman et al. | 385/49 |
| 5,345,524 | A | * | 9/1994 | Lebby et al. | 385/88 |

(Continued)

FOREIGN PATENT DOCUMENTS

| CN | 1761107 | 4/2006 |
| CN | 1950742 | 4/2007 |

(Continued)

*Primary Examiner* — Rhonda Peace
(74) *Attorney, Agent, or Firm* — WPAT, PC; Justin King

(57) ABSTRACT

An optical coupler module includes a semiconductor substrate disposed on the print circuit board; a reflecting trench structure formed on the semiconductor substrate; a reflector formed on a slant surface of the reflecting trench structure; a strip trench structure formed on the semiconductor substrate and connecting with the reflecting trench structure; a thin film disposed on the above-mentioned structure. The optical coupler module further includes a signal conversion unit disposed on the semiconductor substrate and the position of the signal conversion unit corresponds to the reflector; and an optical waveguide structure formed in the trench structures. The optical signal from the signal conversion unit is reflected by the reflector and then transmitted in the optical waveguide structure, or in a reverse direction to reach the signal conversion unit.

18 Claims, 7 Drawing Sheets

(56) References Cited

U.S. PATENT DOCUMENTS

| | | | |
|---|---|---|---|
| 5,420,954 A * | 5/1995 | Swirhun et al. | 385/92 |
| 5,444,805 A * | 8/1995 | Mayer | 385/49 |
| 5,446,814 A * | 8/1995 | Kuo et al. | 385/31 |
| 5,764,832 A | 6/1998 | Tabuchi | |
| 6,088,492 A * | 7/2000 | Kaneko et al. | 385/14 |
| 6,257,771 B1 * | 7/2001 | Okayasu | 385/89 |
| 6,393,184 B1 * | 5/2002 | Day et al. | 385/49 |
| 6,640,021 B2 * | 10/2003 | Pogge et al. | 385/14 |
| 6,885,795 B1 | 4/2005 | Hsu et al. | |
| 6,955,481 B2 * | 10/2005 | Colgan et al. | 385/89 |
| 7,206,472 B2 * | 4/2007 | Huang et al. | 385/14 |
| 7,306,378 B2 | 12/2007 | Alduino et al. | |
| 2004/0258345 A1 * | 12/2004 | Griese et al. | 385/14 |
| 2009/0148096 A1 * | 6/2009 | Yamamoto | 385/14 |
| 2010/0215312 A1 * | 8/2010 | Daikuhara et al. | 385/14 |
| 2012/0057822 A1 * | 3/2012 | Wu et al. | 385/49 |

FOREIGN PATENT DOCUMENTS

| | | |
|---|---|---|
| DE | 19624366 | 1/1998 |
| JP | H11183761 | 7/1999 |
| JP | 2000-105327 | 4/2000 |
| JP | 2002-131565 | 5/2002 |
| JP | 2004-251976 | 9/2004 |
| JP | 2007-241211 | 9/2007 |
| JP | 2008-65287 | 3/2008 |
| JP | 2009109808 | 5/2009 |
| WO | WO2007/091733 A2 | 8/2007 |
| WO | 2008121075 | 10/2008 |
| WO | 2009098834 | 8/2009 |

* cited by examiner

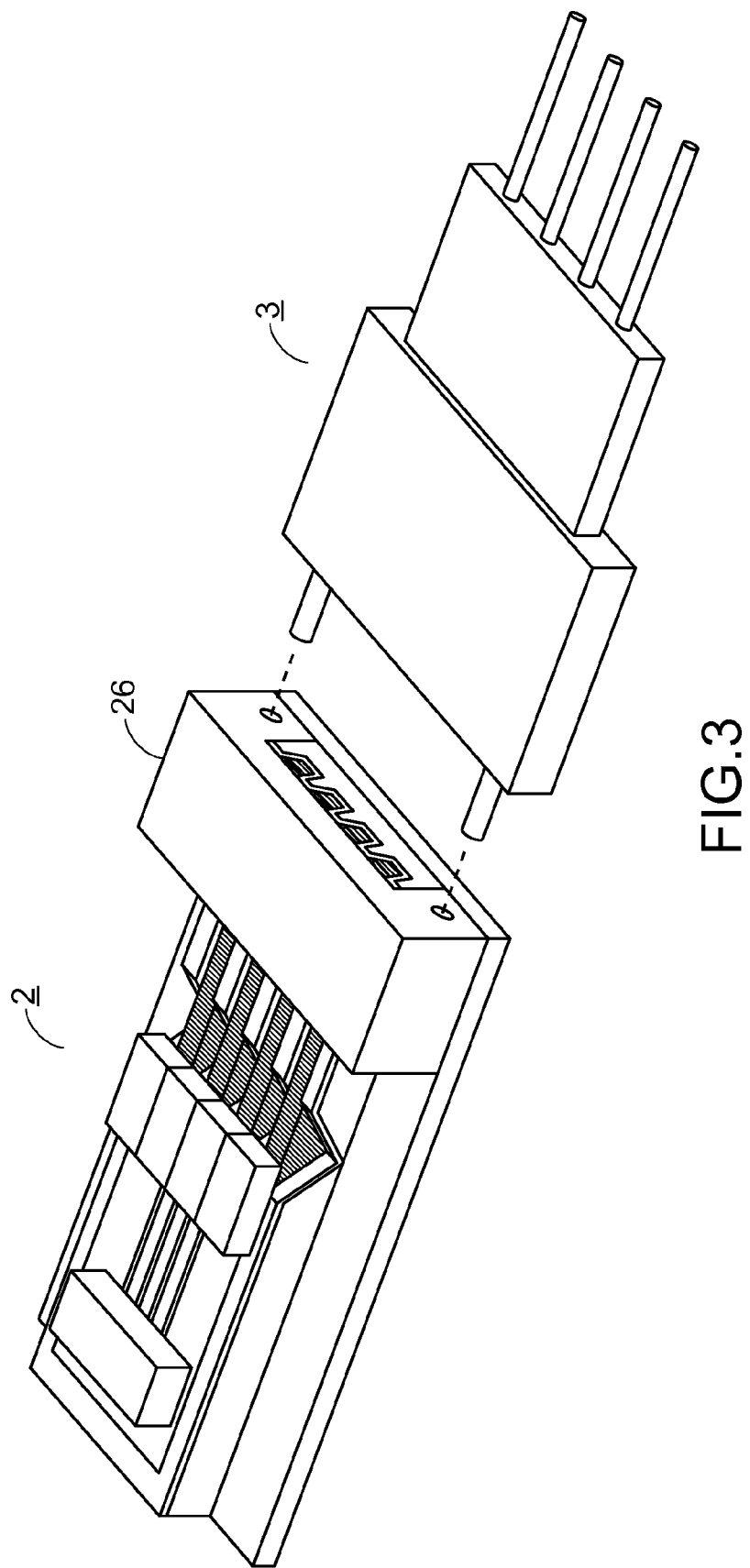

OPTICAL COUPLER MODULE HAVING OPTICAL WAVEGUIDE STRUCTURE

FIELD OF THE INVENTION

The present invention relates to an optical coupler module having an optical waveguide structure, and more particularly to the optical coupler module having the optical waveguide structure for converting and transmitting optical/electrical signals with total internal reflection phenomenon.

BACKGROUND OF THE INVENTION

Conventionally, copper wires are widely used for transmitting electrical signals or data between different components in a cheap and convenient way. In a high performance electronic system, since more and more processors are connected to cooperate in tasks and the signal processing speed upgrades, it is important to enhance the quality and speed of transmitting the signals and data between the processors. However, the conventional copper wires fail to meet these requirements.

Compared with the electrical signals, optical signals can be transmitted over longer distances and at higher bandwidths. Therefore, optical connection is much emphasized nowadays, and the optical transmission gradually replaces the electrical transmission. For example, with development of light emitting diodes (LEDs) and semiconductor laser, light becomes suitable to be a transmission medium. An optical coupler device may be used to convert electrical signals into optical signals, convert optical signals into electrical signals, and emit and receive the electrical signals and optical signals. The optical coupler device includes for example an optical emitter or a light source unit for emitting optical signals, an optical receiver or a light-detecting unit for receiving optical signals, or a driver circuit or an amplifier circuit for driving these units or amplifying these signals.

An optical coupler device has been described in U.S. Pat. No. 7,306,378. Please refer to FIG. 1A, a side cross-sectional view illustrating the optical coupler device 101. The optical coupler device 101 includes a trench 105 defined in a semiconductor substrate 103. A reflector 107 is defined at a first end of the trench 105, and there is an angle between the reflector 107 and the lengthwise direction of the trench 105. An optical fiber 109 is disposed at a second end of the trench 105. An optical device 111 is mounted on the semiconductor substrate 103 proximate to the trench 105 such that the optical device 111 is optically coupled to the optical fiber 109 via the reflector 107. The optical device 111 may be an optical emitter for outputting optical signals 113 or an optical receiver for receiving optical signals 113.

The semiconductor substrate 103 is mounted on a printed circuit board (PCB) 115 including contacts 117 which are electrically coupled to the semiconductor substrate 103. A circuit 125 is included in another semiconductor substrate 127 which is mounted on the semiconductor substrate 103 by contacts 131. The circuit 125 can drive or control the optical device 111 to convert electrical signals 119 from the contacts 117 into optical signals 113. The optical signals 113 are reflected by the reflector 107 and outputted through the optical fiber 109. In a reverse direction, the optical signals 113 inputted from the optical fiber 109 are reflected by the reflector 107 and received by the optical device 111. The optical signals 113 are converted into electrical signals 119 to be outputted through the contacts 117. A lid 133 is mounted over the semiconductor substrate 103 and encloses the optical device 111. The lid 133 protects the enclosed items.

A plurality of corresponding optical fibers 109, trenches 105, reflectors 107 and optical devices 111 may be included in one optical coupler device 101. As shown in FIG. 1B, two optical coupler devices 101a and 101b include a plurality of sets, each of which includes an optical device 111, a trench 105 and an optical fiber 109. They are connected to each other through the representative optical fibers (only two optical fibers 109a and 109b are shown) to achieve signal transmission.

However, in the above coupler device, it is difficult to accurately mount the optical fibers in the fine trenches. A slight error may affect the optical transmission because the light cannot travel in the optical coupler device precisely. Furthermore, because the optical fiber is close to the optical device, the optical device is easily to be damaged during assembly. Another disadvantage is that the optical fiber is fixed in the trench after assembly, and no pluggable function is provided. In addition, an exposed back end of the optical fiber may also cause some inconvenience of use.

Therefore, there is a need of providing an optical coupler module which can be manufactured easily without complicated assembling and aligning action in order to obviate the drawbacks encountered from the prior art.

SUMMARY OF THE INVENTION

The present invention provides an optical coupler module which is adapted to be applied on a print circuit board for transmitting and converting an electrical signal. The optical coupler module includes a semiconductor substrate disposed on the print circuit board; a reflecting trench structure formed on the semiconductor substrate; a reflector formed on a slant surface of the reflecting trench structure; a strip trench structure formed on the semiconductor substrate and connected with the reflecting trench structure; a thin film disposed on the semiconductor substrate, the reflecting trench structure and the strip trench structure; a light source unit disposed on the semiconductor substrate and its position corresponding to the reflector; and an optical waveguide structure formed in the strip trench structure and extending to the slant surface of the reflecting trench structure. The light source unit receives and converts the electrical signal into an optical signal. The optical signal is then directed into the optical waveguide structure, reflected by the reflector, and transmitted along the optical waveguide structure in sequence.

The present invention provides an optical coupler module which is adapted to be applied on a print circuit board for transmitting and converting an optical signal. The optical coupler module includes a semiconductor substrate disposed on the print circuit board; a reflecting trench structure formed on the semiconductor substrate; a reflector formed on a slant surface of the reflecting trench structure; a strip trench structure formed on the semiconductor substrate and connected with the reflecting trench structure; a thin film disposed on the semiconductor substrate, the reflecting trench structure and the strip trench structure; a light detection unit disposed on the semiconductor substrate and its position corresponding to the reflector; and an optical waveguide structure formed in the strip trench structure and extending to the slant surface of the reflecting trench structure. The optical signal is directed into the optical waveguide structure, transmitted along the optical waveguide structure, and reflected by the reflector in sequence to reach the light detection unit. Then, the light detection unit converts the optical signal into an electrical signal.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 3 is a schematic diagram showing the optical connection between the optical coupler module according to the present invention and an adapter;

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides an optical coupler module which involves electrical-optical coupler module and optical-electrical coupler module. In practice, the optical coupler module according to the present invention may serve as an optical transmitter module for electrical-optical signal conversion, an optical receiver module for optical-electrical signal conversion or an optical transceiver module for both conversions. The present invention takes advantage of easy semiconductor process and optical waveguide structure to overcome the problem encountered in the prior arts.

Figure 1A:
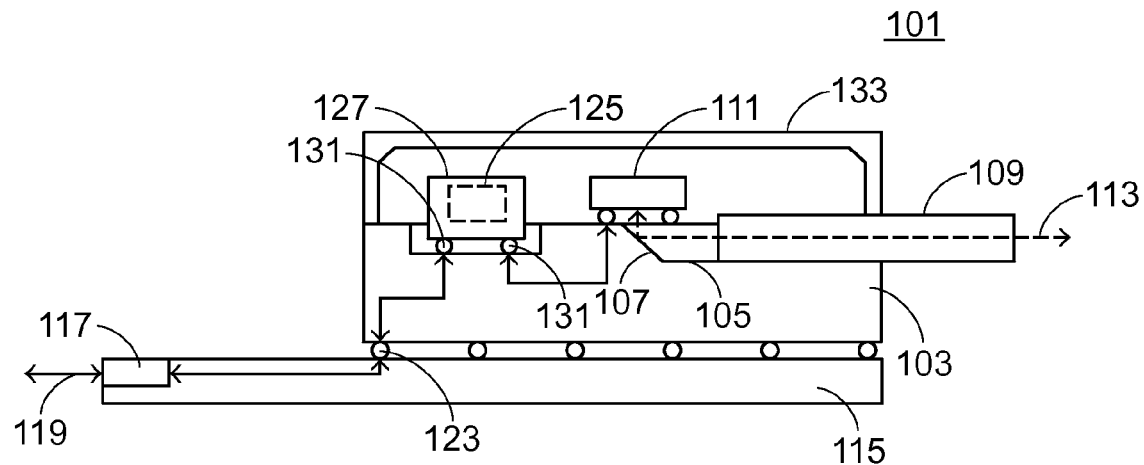
FIG. 1A is a side cross-sectional view illustrating a conventional optical coupler device.
Figure 1B:
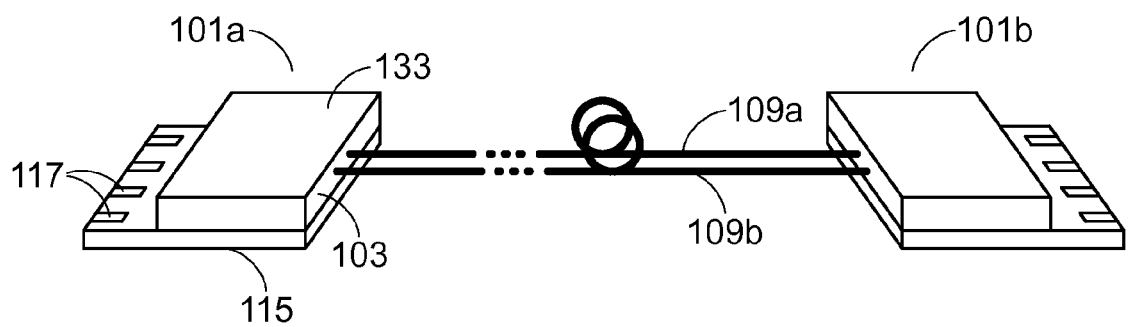
FIG. 1B is a schematic diagram showing the connection between two conventional optical coupler devices.
Figure 2A:
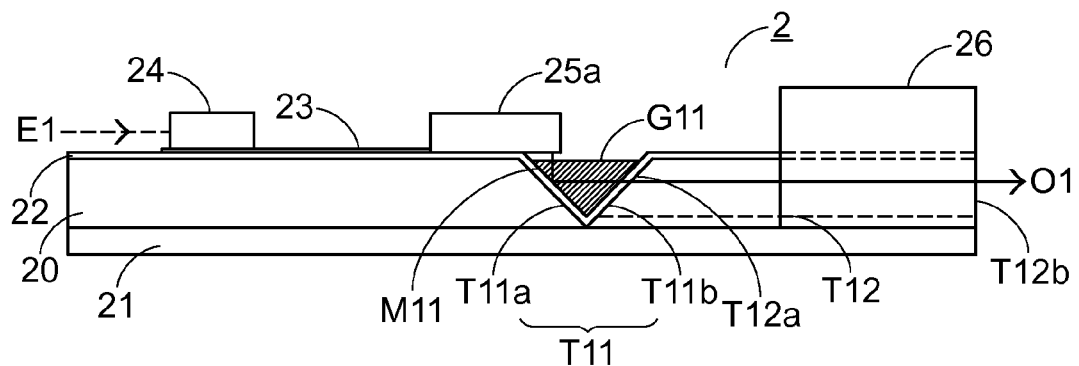
FIG. 2A is a side schematic diagram illustrating an embodiment of an optical coupler module according to the present invention.
Figure 2B:
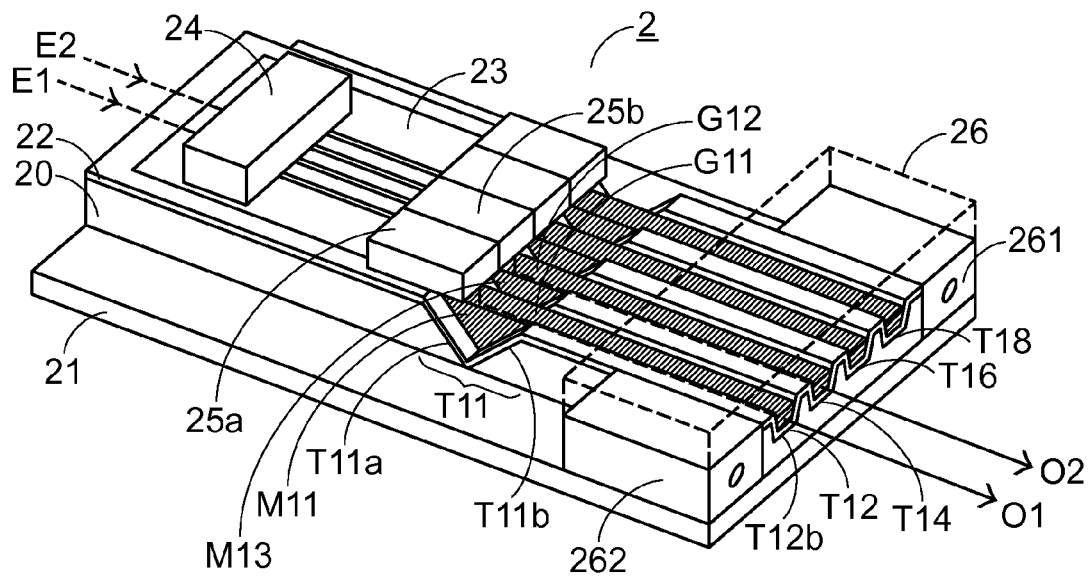
FIG. 2B is a perspective view of the optical coupler module of FIG. 2A.

Please refer to FIG. 2A and FIG. 2B, a side schematic diagram and a perspective view illustrating an embodiment of an optical coupler module according to the present invention. The optical coupler module 2 can be applied on a print circuit board 21. The optical coupler module 2 includes a semiconductor substrate 20, a reflecting trench structure T11, a strip trench structure T12, a thin film 22, a light source unit 25a, an optical waveguide structure G11 and a coupling unit 26. The semiconductor substrate 20 is disposed on the print circuit board 21. The reflecting trench structure T11 and the strip trench structure T12 is formed by etching the semiconductor substrate 20. The reflecting trench structure T11 is defined by two slant surfaces T11a and T11b. One end T12a of the strip trench structure T12 runs through the slant surface T11b of the reflecting trench structure T11 to connect with the reflecting trench structure T11. In the embodiment, the reflecting trench structure T11 and the strip trench structure T12 have a V-shaped cross section and a trapezoidal cross section, respectively. The reflecting trench structure T11 and the strip trench structure T12 are connected with each other, and preferably, the reflecting trench structure T11 is almost or exactly perpendicular to the strip trench structure T12.

The optical coupler module of the present invention can be used as an optical transmitter module, an optical receiver transmitter or an optical transceiver module that can transmit or receive at least one optical signal. In other words, the optical coupler module includes at least one signal conversion unit such as light source unit or light detection unit. In the embodiment, the signal conversion unit is a light source unit 25a. The optical waveguide structure G11 is formed in the strip trench structure T12 and extending to the slant surface T11a of the reflecting trench structure T11. In FIG. 2B, there are four strip trench structures T12, T14, T16, T18 that have same profiles, but the present invention is not limited to this. The optical coupler module 2 may include at least one reflecting trench structure T11 cooperative with at least one strip trench structure T12.

In the embodiment, the optical coupler module 2 further includes a reflector M11 formed on the slant surface T11a of the reflecting trench structure T11 for reflecting light. In details, the slant surface T11a is formed by the etching procedure. After the thin film 22 is formed over the etched semiconductor substrate 20, the reflector M11 is formed by depositing or coating reflective material on the thin film 22 corresponding to the slant surface T11a. An angle between the reflector M11 (or the slant surface T11a of the reflecting trench structure T11) and the print circuit board 21 or a bottom surface of the semiconductor substrate 20 is about or exactly 45 degrees. In the embodiment, another angle between the slant surface T11b and the print circuit board 21 is also about or exactly 45 degrees. It is to be noted that the later may be of other degrees.

In other embodiments, the angle between the reflector M11 and the surface of the semiconductor substrate 20 is 45±15 degrees or limited to 45±10 degrees. The reflector M11 is formed on the thin film 22 after the thin film 22 is formed on the slant surface T11a of the reflecting trench structure T11. In other embodiments, the reflector M11 can be formed by depositing or coating reflective material on the slant surface T11a of the reflecting trench structure T11, and then the thin film 22 is formed on the reflector M11 and other surfaces of the resultant structure. It is to be noted that the reflection effect of the M11 is not affected even though the thin film 22 is formed on the reflector M11.

In the embodiment, the reflecting trench structure T11 and the strip trench structure T12 are described for exemplary purposes, and configuration of other strip trench structures can be deduced from the strip trench structures T12. Please refer to FIG. 2C, another side schematic view of the optical coupler module 2. The end T12b of the strip trench structure T12 (and other strip trench structures T14, T16, T18) is trapezoidal in shape. The optical coupler module 2 at this end has a relatively flat surface, and it is adequate to be coupled to adapters or connectors. In addition, the angle between any surfaces of the strip trench structure T12 and the surface of the print circuit board 21 may be about or exactly 45 degrees. The angle is decided by the etching process of forming the strip trench structure T12. In other embodiments, the angles may be other degrees, such as 90 degrees. The shapes of the trench structures also decide the profile of the optical waveguide structure formed therein. The optical waveguide structure may or may not fill up the strip trench structures.

Figure 2C:
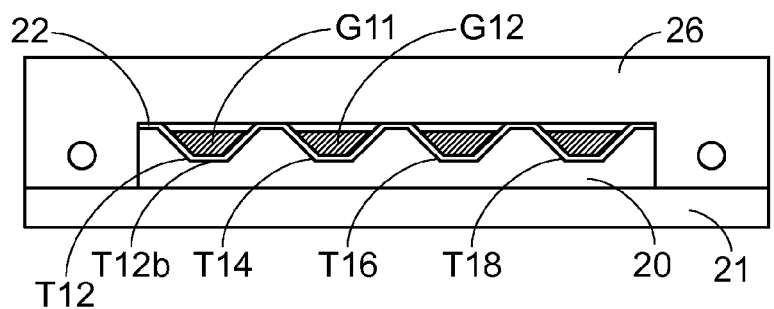
FIG. 2C is another side schematic diagram of the optical coupler module of FIG. 2A.

Referring to FIGS. 2A to 2C, the semiconductor substrate 20 may be a silicon wafer with single-side polished, and it may be treated by known semiconductor process. As such, after the related trench structures are formed, the thin film 22 is formed on the reflecting trench structure T11, the strip trench structure T12 and other surfaces of the semiconductor substrate 20. The thin film 22 is a dielectric layer such as a silicon dioxide layer. The thin film 22 can provide electrical insulation for the optical signal transmission so as to prevent electromagnetic interference and leakage of electrical signals into the below silicon substrate 20. Furthermore, the thin film 22 can assist total internal reflection effect for transmitting optical signals in the optical waveguide structure G11.

In the embodiment, the thin film 22 can be formed by oxidizing a portion of the silicon substrate after the silicon substrate 20 is etched to form the trench structures T11 and T12. In other embodiments, the thin film 22 can be made of other dielectric materials with required refractive index, such as silicon nitride (SiNx). Alternatively, the thin film 22 may be a composite layer including a metal film and a metal oxide film. The metal film can assist total internal reflection for transmitting light or optical signals in the optical waveguide structure, but the metal film absorbs light, and thus a portion of the optical signals may be lost.

The print circuit board 21 that cooperates with the optical coupler module 2 provides electrical signals E1 to the optical coupler module 2. The light source unit 25a is disposed above the semiconductor substrate 20 and the thin film 22. A portion of the light source unit 25a is located above the reflecting trench structure T11 to irradiate the slant surface T11a of the reflecting trench structure T11. In other words, the position of the light source unit 25a corresponds to the reflector M11. In the embodiment, the optical waveguide structure G11 is made of polymer. The optical waveguide structure G11 is formed in the strip trench structure T12 and extending to the reflector M11 by the semiconductor process. For example, polymer material is formed over the thin film 22, and then a lithography process is performed to define the optical waveguide structure G11 in the reflecting trench structure T11 and the strip trench structure T12. After the other portion of the polymer material is etched out, the optical waveguide structure G11 is formed, as shown in FIG. 2B.

In the embodiment, the optical waveguide structure G11 is parallel to other optical waveguide structures, for example the optical waveguide structure G12, and it is used to transmit optical signals. In details, the optical signals (for example O1) are transmitted in the optical waveguide structures (for example G11) with total internal reflection. Therefore, the refractive index of the thin film 22 should be less than that of the optical waveguide structure. For example, if the thin film 22 is made of silicon dioxide whose refractive index is about 1.46~1.5, the optical waveguide structure can be made of polymer whose refractive index is about 1.56~1.6. The greater difference between the refractive indexes allows total internal reflection to occur for optical signals with various incident angles.

The light source unit 25a may be a light emitting diode, a semiconductor laser or a vertical cavity surface emitting laser (VCSEL) for generating or issuing the optical signals in response to the electrical signals E1. In details, referring to FIG. 2A and FIG. 2B, the optical coupler module 2 further includes an electrical transmission unit 23. The electrical transmission unit 23 is disposed on the thin film 22 and electrically connected with the light source unit 25a. In addition, the optical coupler module 2 further includes a driving circuit 24. In the embodiment, the driving circuit 24 is disposed on the electrical transmission unit 23. The driving circuit 24 is electrically connected with the electrical transmission unit 23 and the print circuit board 21, so that the driving circuit 24 can control or drive the light source unit 25a in response to the electrical signals E1 provided by the print circuit board 21 via the electrical transmission unit 23.

In the embodiment, the driving circuit 24 is formed on the semiconductor substrate 20 by flip chip process without wiring. In other embodiments, the optical coupler module and the print circuit board are integrated by system in package (SiP) technology. Thus, the driving circuit 24 is connected with the electrical transmission unit 23 and the print circuit board 21 by wiring or an interconnection structure formed in the semiconductor substrate 20.

In the embodiment, the light source unit 25a receives and converts the electrical signals E1 into the optical signals O1. The optical signals O1 are directed into the optical waveguide structure G11 and reflected by the reflector M11. In a preferred embodiment, the light source unit 25a is very close to the optical waveguide structure G11, so that the optical signals O1 enter the optical waveguide structure G11 effectively to be transmitted along an axial direction of the optical waveguide structure G11. Some optical signals deviated from the normal incident angle are transmitted in the optical waveguide structure G11 with total internal reflection because the incident angle is greater than the critical angle for total internal reflection. Therefore, the design of the V-shaped reflecting trench structure T11 should restrict the optical signals O1 within the optical waveguide structure G11 without escaping from the optical waveguide structure G11 via the reflecting trench structure T11.

In the embodiment, the optical coupler module 2 can process a plurality of electrical signals at the same time. For example, the optical coupler module 2 includes four light source units cooperative with four optical waveguide structures and four reflectors capable of receiving and converting four electrical signals simultaneously. Taking electrical signals E2 as example, the driving circuit 24 receives the electrical signals E2 provided by the print circuit board 21 to drive the light source unit 25b. The light source unit 25b converts the electrical signals E2 into optical signals O2 to be outputted. In the design, another reflector M13 is provided on the thin film 22 corresponding to a portion of the slant surface T11a of the reflecting trench structure T11 and its position corresponds to the light source unit 25b. The four light source units 25b may be integrally or individually formed. The number of the light source units and corresponding optical waveguide structures can be adjusted to meet various requirements.

Similarly, a strip trench structure T14 is formed on the semiconductor substrate 20. One end of the strip trench structure T14 runs through the slant surface T11b of the reflecting trench structure T11 to connect with the reflecting trench structure T11. An optical waveguide structure G12 is formed in the strip trench structure T14 and extending to the reflector M13. The optical signals O2 enter the optical waveguide structure G12 and then are reflected by the reflector M13 so as to be transmitted along the axial direction of optical waveguide structure 12. In other embodiments, the reflective material is coated on a portion of the thin film 22 covering the whole slant surface T11a of the reflecting trench structure T11, so that the reflectors M11 and M13 are integrally formed.

To couple the optical coupler module 2 to external adapters, the coupling unit 26 is disposed on the print circuit board 21. In the embodiment, the coupling unit 26 includes two fixing bases 261, 262, and the design of the coupling unit 26 allows the optical coupler module 2 to be coupled with the conventional adapter, for example a conventional adapter for optical coupler modules having sub-mount silicon substrate or an optical fiber ribbon connector. In details, each fixing bases 261, 262 has alignment holes for receiving guiding pins of the adapter. Please refer to FIG. 3, a schematic diagram showing the connection between the optical coupler module 2 and an adapter 3. In the embodiment, the coupling unit 26 has a configuration covering the top surface and the lateral surfaces of the semiconductor substrate 20, and the coupling unit 26 is integrally formed.

It is to be noted that the number of the optical fibers in the adapter 3 should correspond to that of the optical waveguide structures in the optical coupler module 2. In other words, the adapter 3 has the corresponding connection interface. According to the recent semiconductor technology, the thickness of the silicon substrate 20 can be adjusted with errors less than 25 microns. When the coupling unit 26 is attached to the print circuit board 21 by bonding or die bonding, the accuracy is about 1~3 microns by means of etching or adjusting the bonding position. As such, the errors of configuring the coupling unit 26 can be controlled to the least, and the optical waveguide structure and the optical fiber can be successfully coupled to each other. For example, the optical signals O1 can be transmitted from the optical waveguide structure G11 to the optical fiber in the adapter 3.

It is to be noted that the above design is pluggable, but the elements of the optical coupler module 2 would not be damaged while connecting to the adapter 3. It should be understood that the configuration of the coupling unit 26 is not limited to this embodiment. For example, the two fixing bases may be separately formed. In the design, although the complexity increases, the accuracy is further improved.

Figure 4:
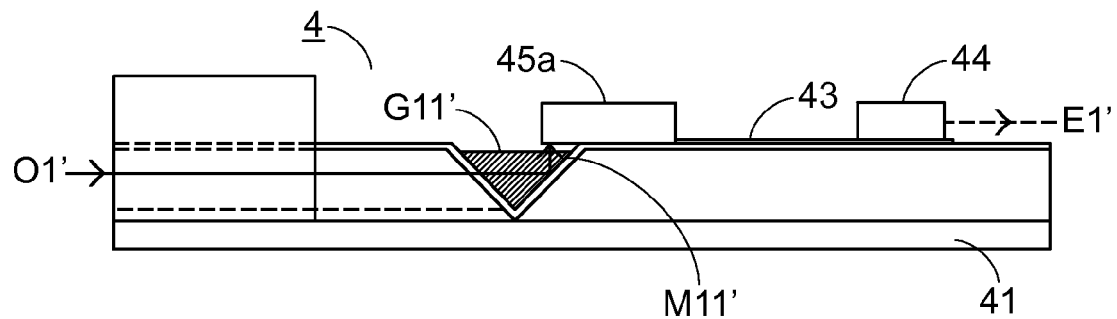
FIG. 4 is a side schematic diagram illustrating another embodiment of an optical coupler module according to the present invention.

In the above-mentioned embodiment, the optical coupler module is an optical transmitter module for electrical-optical signal conversion. According to the similar principle, the optical coupler module may be an optical receiver module for optical-electrical signal conversion. For the above-mentioned optical transmitter module, the optical signals O1 are directed into the optical waveguide structure G11, transmitted along the optical waveguide structure G11, and outputted to the optical fiber in the adapter 3 connected with the optical transmitter module. Then, the optical signals O1 are received by another optical coupler module such as an optical receiver module. FIG. 4 is a side schematic diagram illustrating another optical coupler module, i.e. an optical receiver module according to the present invention. The optical coupler module 4 has a similar structure to the optical coupler module 2. The difference between the optical coupler module 4 and the optical coupler module 2 is that the signal transmission direction and the optical-electrical conversion. For performing the optical-electrical conversion, a light detection unit 45a and a transimpedance amplifier circuit 44 replace the light source unit 25a and the driving circuit 24.

The light detection unit 45a can be a photodiode or a photodetector (PD) capable of receiving and converting the optical signals. In details, the position of the light detection unit 45a corresponds to the reflector M11'. Therefore, after the optical signal O1' enters the optical waveguide structure G11' via the adapter, the optical signals O1' are reflected to the light detection unit 45a, and then the light detection unit 45a converts the optical signals O1' into electrical signals E1'. The optical coupler module 4 is applied on a print circuit board 41. The transimpedance amplifier circuit 44 is connected with the electrical transmission unit 43 and the print circuit board 41, so that the electrical signals E1' are amplified before being outputted.

The optical coupler module 4 can process a plurality of optical signals at the same time as described above with reference to FIG. 2B and FIG. 2C. In other words, more than one light detection unit is integrally or individually formed on the semiconductor substrate to receive respective optical signals from corresponding optical waveguide structures. Furthermore, at least one light source unit and at least one optical detection unit may be provided in one optical coupler module. Such optical coupler module is called as optical transceiver module which can process both electrical signals and optical signals.

In the above-mentioned embodiment, the optical signals are reflected once to change the direction of the light path to allow the optical signals to be transmitted to desired direction. According to the feature, the optical coupler module of the present invention can be applied to signal transmission between print circuit boards, chips or other elements by changing the direction of the light path as required. For example, the optical signals can be reflected more than once to be transmitted to specific direction and position.

Figure 5A:
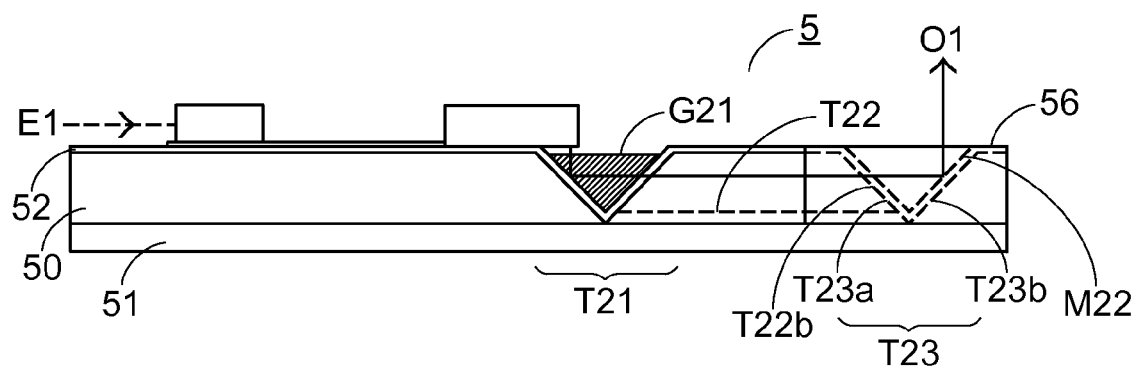
FIG. 5A is a side schematic diagram illustrating a further embodiment of an optical coupler module according to the present invention.
Figure 5B:
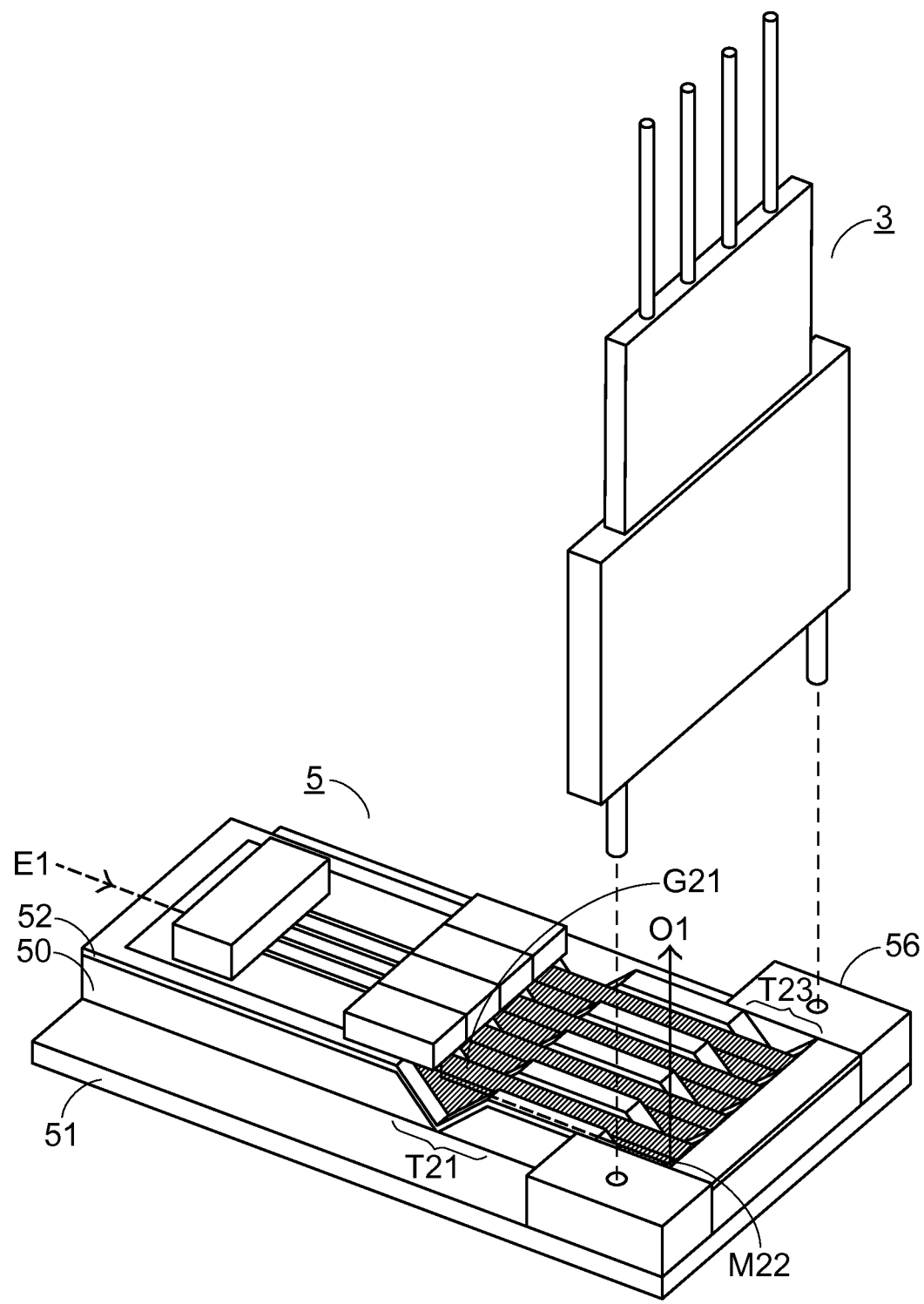
FIG. 5B is a schematic diagram showing the optical connection between the optical coupler module according to the present invention and an adapter.

Please refer to FIG. 5A and FIG. 5B showing an embodiment of an optical coupler module according to the present invention and the connection between the optical coupler module and an adapter. The optical coupler module 5 is similar in principle to the optical coupler module 2, but the optical coupler module 5 further includes another reflecting trench structure T23. The reflecting trench structure T23 is defined by two slant surfaces T23a and T23b. One end T22b of the strip trench structure T22 and other strip trench structures runs through the slant surface T23a of the reflecting trench structure T23 to connect with the reflecting trench structure T23. Preferably, the reflecting trench structure T23 is almost or exactly perpendicular to the strip trench structure T22, and the reflecting trench structures T21 and T23 are almost or exactly parallel to each other. In the embodiment, the thin film 52 covers the slant surfaces T23a and T23b of the reflecting trench structure T23 together with other exposed surfaces. A reflector M22 is formed on the thin film 52 corresponding to the slant surface T23b of the reflecting trench structure T23, so that the optical signals O1 transmitted in the strip trench structure T22 can be reflected by the reflector M22 to change the direction of the light path again. Thus, the optical signals O1 are outputted upwards relative to the semiconductor substrate 50.

In the embodiment, the coupling unit 56 should be modified correspondingly, as shown in FIG. 5B. After the guiding pins of the adapter 3 are plugged in the alignment holes on the coupling units 56, the reflector M22 should successfully reflect the optical signals O1 into optical fibers in the adapter 3 to achieve optical connection. In the embodiment, the two fixing bases of the coupling unit 56 are disposed on the print circuit board 51 by bonding or die bonding. The thickness of the coupling unit 56 can be adjusted by etching process to calibrate the light path. Therefore, the optical signals O1 are transmitted in the optical waveguide structure G21, reflected by the reflector M22, and outputted to the optical fiber in the adapter 3 in sequence. In the embodiment, the coupling unit 56 is arranged to surround the lateral surfaces of the semiconductor substrate 50. It is to be noted that such design or configuration can also be applied to optical receiver modules or optical transceiver modules as described above.

Figure 6:
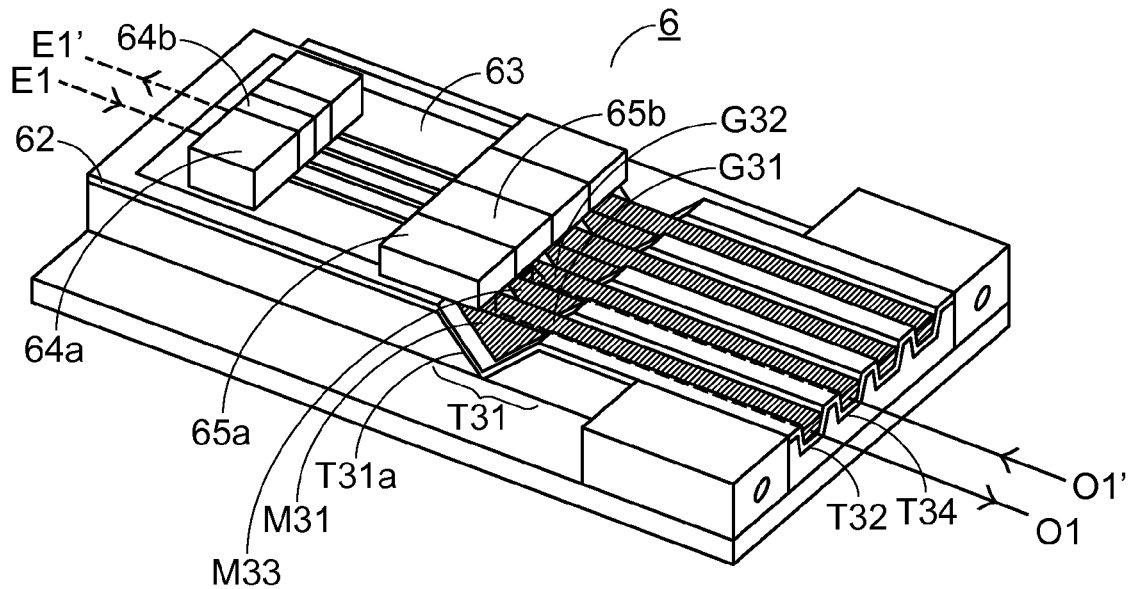
FIG. 6 is a perspective view of a further embodiment of an optical coupler module according to the present invention.

As described above, the optical coupler module can serve as an optical transceiver module for performing both electrical-optical conversion and optical-electrical conversion. For example, some optical waveguide structures are configured to transmit optical signals from the light source units to external elements, while some optical waveguide structures are configured to transmit optical signals from the external elements to the optical detection units. FIG. 6 illustrates this type of optical coupler module. The optical coupler module 6 includes both light source units and light detection units, and each of which faces a corresponding reflector to transmit or receive optical signals to or from a corresponding optical waveguide structure.

For example, the optical coupler module 6 includes a light source unit 65a and a light detection unit 65b which are mounted close to each other. The light source unit 65a and the light detection unit 65b are mounted above the slant surface T31a of the reflecting trench structure T31. The positions of the light source unit 65a and the light detection unit 65b correspond to the reflectors M31 and M33, respectively. The optical waveguide structures G31 and G32 are formed in the strip trench structures T32 and T34 and extending to the reflectors M31 and M33. In addition, a thin film 62 with specific refractive index is formed under the optical waveguide structures G31 and G32. The driving circuit 64a and the transimpedance amplifier circuit 64b are electrically connected to the light source unit 65a and the light detection unit 65b via the electrical transmission unit 63. In details, the light source unit 65a receives and coverts the electrical signals E1 into the optical signals O1. The optical signals O1 are reflected by the reflector M31 and transmitted along the optical waveguide structure G31. On the other hand, the external optical signals O1' are transmitted along the optical waveguide structure G32 and reflected by the reflector M33. Then, the optical signals O1' are converted into the electrical signals E1' by the light detection unit 65b.

Figure 7:
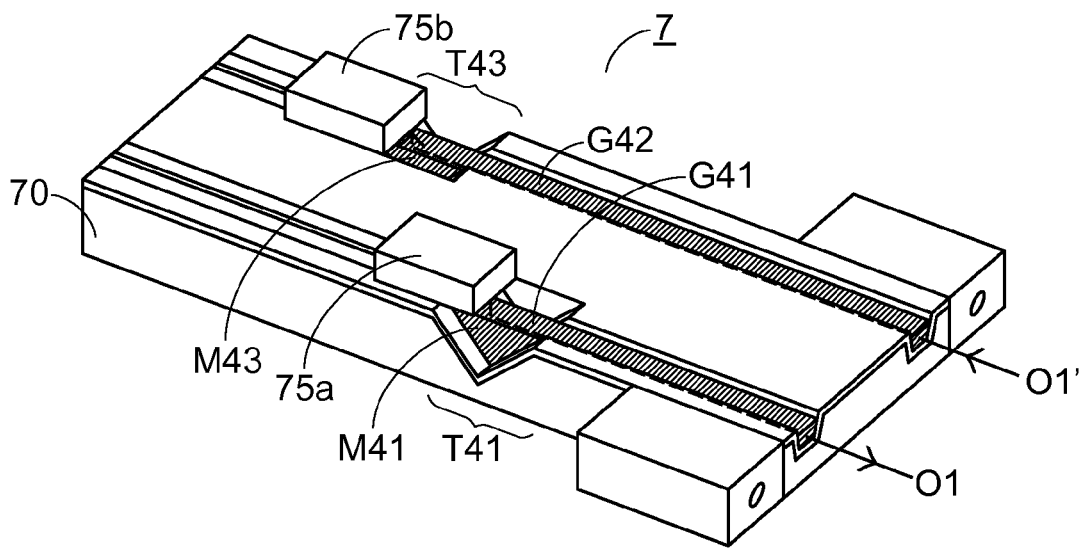
FIG. 7 is a perspective view of a further embodiment of an optical coupler module according to the present invention.

For an optical transceiver module, it is not necessary to mount the light source unit and the light detection unit above the same reflecting trench structure. Please refer to FIG. 7 illustrating this type of optical coupler module. In the optical transceiver module 7, the reflecting trench structures T41 and T43 in the semiconductor substrate 70 are not connected with all strip trench structures. In the design, the light source unit 75a and the light detection unit 75b are separately provided above the reflectors M41 and M43, respectively. The reflectors M41 and M43 are formed on different reflecting trench structures T41 and T43. Therefore, the optical waveguide structures G41 and G42 have different lengths, and the light path lengths for the optical signals O1 and O1' are also different. For example, the optical waveguide structure G41 is shorter than the optical waveguide structure G42.

When the optical coupler module is applied to high-level applications, a monitor photodiode (MPD) unit is usually used to detect the intensity of optical signals. If the light intensity changes due to temperature or other environmental factors, the monitor photodiode unit will detect the change and notify the driving circuit to adjust the output of the light source units correspondingly. As such, the light intensity of the optical signals can be effectively kept at certain level.

Figure 8A:
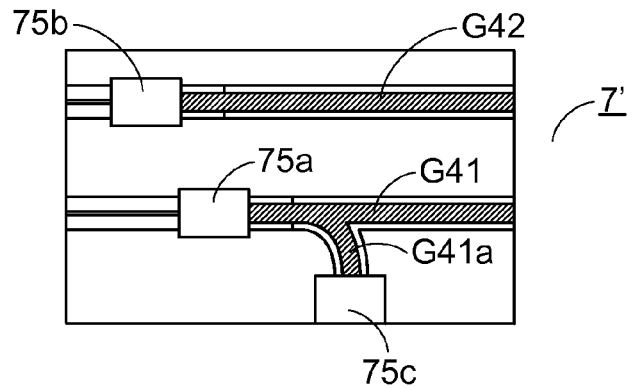
FIG. 8A is a top view of a further embodiment of an optical coupler module according to the present invention.

Please refer to FIG. 8A, a top view of an embodiment of the optical coupler module. The optical coupler module 7' includes a monitor photodiode unit 75c. The monitor photodiode unit 75c is mounted on the semiconductor substrate by the same mounting method as the light source unit 75a and the light detection unit 75b. It is shown that a branching trench structure extending from the strip trench structure to the monitor photodiode unit 75c is defined in the semiconductor substrate. A branching optical waveguide structure G41a is formed in the branching trench structure. The branching optical waveguide structure G41a receives and passes a portion of the optical signals to the monitor photodiode unit 75c via a reflector (not shown) under the monitor photodiode unit 75c. The reflector may be formed as described in the above-mentioned embodiments. According to the feedback mechanism, the light intensity of the outputted optical signals is kept greater enough to ensure effective optical transmission.

Figure 8B:
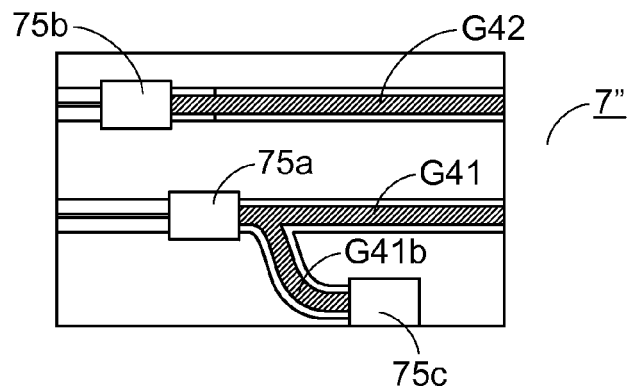
FIG. 8B is a top view of a further embodiment of an optical coupler module according to the present invention.

The branching optical waveguide structure G41a is formed along with the optical waveguide structure G41. For example, a polymer layer is formed over the whole structure, and a lithography and etching process is performed to remove undesired portion of the polymer layer to remain the branching optical waveguide structure G41a and the optical waveguide structure G41. FIG. 8B illustrates another optical coupler module 7" whose branching optical waveguide structure G41b has modified configuration.

In the above-mentioned embodiments, there are intersected reflecting trench structures and strip trench structures defined on the semiconductor substrate. The reflectors are formed on the slant surfaces of the reflecting trench structures, in other words, usually at the intersections of the reflecting trench structures and the strip trench structures. In fact, the reflectors can be provided on the light path to accurately transmit the optical signals without forming the reflecting trench structures. Thus, the method for manufacturing the optical coupler module can be further simplified.

Figure 9:
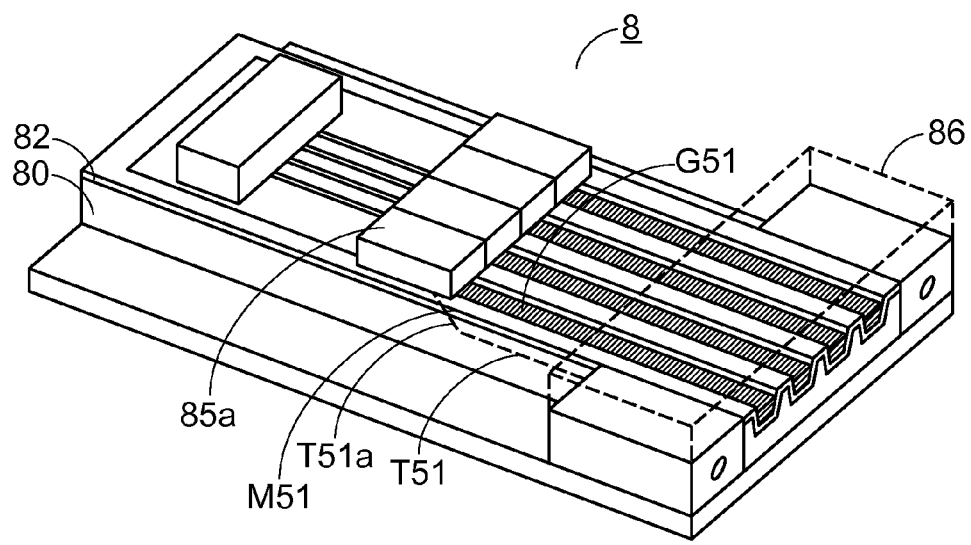
FIG. 9 is a perspective view of a further embodiment of an optical coupler module according to the present invention.

Please refer to FIG. 9 illustrating the simplified optical coupler module. In the optical coupler module 8, there are a plurality of strip trench structures formed on the semiconductor substrate 80. The strip trench structures may be arranged in parallel with each other. It is to be noted that each strip trench structure has a slant surface at one side. The reflectors are formed on the slant surfaces or the thin film corresponding to the slant surfaces. For example, the strip trench structure T51 on the semiconductor substrate 80 has a slant surface T51a at one side. The angle between the slant surface T51a and a bottom surface of the semiconductor substrate 80 is about 45 degrees, but not limited to this. A thin film 82 is formed on the semiconductor substrate 80 and the strip trench structure T51. The reflector M51 is formed by depositing or coating a reflective material on the slant surface T51a of the strip trench structure T51. An optical waveguide structure G51 is formed in the strip trench structure T51. A signal conversion unit 85a such as a light source unit or a light detection unit is disposed on the semiconductor substrate 80 and its position corresponds to the reflector M51. The signal conversion unit 85a can generate optical signals in response to electrical signals. Then, the optical signals are reflected by the reflector M51 and transmitted along the optical waveguide structure G51. Alternatively, the external optical signals are received and transmitted by the optical waveguide structure G51, reflected by the reflector M51 and converted by the signal conversion unit 85a in sequence.

The configuration of the coupling unit 86 is similar to the coupling units described in the above-mentioned embodiments. The details or the possible modifications of the optical coupler module are not explained verbosely herein.

In summary, the present invention provides optical coupler modules for electrical-optical or optical-electrical conversion. The optical coupler modules can be manufactured by a simple semiconductor process. The optical coupler modules can be easily coupled to an optical transmission element such as optical fiber without complicated assembly. The pluggable feature of the optical coupler modules without worrying about damage to the control circuit (e.g. driving circuit or transimpedance amplify circuit) or the signal conversion unit (e.g. light source unit or light detection unit) is also attractive. In addition, accuracy of assembly is improved, so that the optical signals can be transmitted from/to the optical fibers successfully. As such, the optical coupler modules of the present invention indeed solve the problems encountered in the prior arts.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical coupler module adapted to be applied on a print circuit board for converting and transmitting a first electrical signal, the optical coupler module comprising:
    a semiconductor substrate disposed on the print circuit board;
    a first reflecting trench structure formed on the semiconductor substrate and defined by two surfaces wherein a first one of the surfaces is a slant surface;
    a first reflector formed on the slant surface of the first reflecting trench structure;
    a first strip trench structure formed on the semiconductor substrate, a first end of the first strip trench structure running through a second one of the surfaces of the first reflecting trench structure to connect with the first reflecting trench structure;
    a thin film disposed on the semiconductor substrate, the first reflecting trench structure and the first strip trench structure, wherein the thin film is a dielectric layer;
    a first light source unit disposed on the semiconductor substrate and the position of the first light source unit corresponding to the first reflector, for converting the first electrical signal into a first corresponding optical signal;
    a first optical waveguide structure formed in the first strip trench structure and extending to the first reflector; and
    a coupling unit disposed on the print circuit board and surrounding portions of surfaces of the semiconductor substrate for coupling the optical coupler module to an adapter;
    wherein the first corresponding optical signal provided by the first light source unit is directed into the first optical waveguide structure, reflected by the first reflector, and transmitted along the first optical waveguide structure to be outputted in sequence; as well as a refractive index of the thin film is less than that of the first optical waveguide structure so that the first corresponding optical signal is transmitted in the first optical waveguide structure with total internal reflection.

2. The optical coupler module according to claim 1, wherein the first light source unit is a light emitting diode, a semiconductor laser or a vertical cavity surface emitting laser.

3. The optical coupler module according to claim 1, wherein an angle between the first reflector and a bottom surface of the semiconductor substrate is 45±15 degrees.

4. The optical coupler module according to claim 1, wherein the optical coupler module comprises:
    an electrical transmission unit disposed on the thin film and electrically connected with the first light source unit, for transmitting the first electrical signal; and
    a driving circuit disposed on the electrical transmission unit, the thin film or the print circuit board, and electrically connected with the electrical transmission unit and the print circuit board, for driving the first light source unit in response to the first electrical signal.

5. The optical coupler module according to claim 1, wherein the first reflecting trench structure and the first strip trench structure are formed on the semiconductor substrate by etching the semiconductor substrate, and the first optical waveguide structure is made of polymer formed by semiconductor process.

6. The optical coupler module according to claim 1, wherein the coupling unit is mounted close to a second end of the first strip trench structure, and the first optical waveguide structure is coupled to an optical fiber in the adapter after the coupling unit is connected with the adapter.

7. The optical coupler module according to claim 1, wherein the optical coupler module comprises:
    a second reflecting trench structure formed on the semiconductor substrate and defined by two surfaces, a second end of the first strip trench structure running through a first one of the surfaces of the second reflecting trench structure to connect with the second reflecting trench structure, and the thin film disposed on the second reflecting trench structure; and
    a second reflector formed on a second one of the surfaces of the second reflecting trench structure,
    wherein the coupling unit is mounted beside the semiconductor substrate near the second reflector, and the first corresponding optical signal is reflected by the second reflector to enter an optical fiber in the adapter after the coupling unit is connected with the adapter.

8. The optical coupler module according to claim 1, wherein the optical coupler module is adapted to transmit and convert a second electrical signal, and the optical coupler module comprises:
    a second reflector formed on the slant surface of the first reflecting trench structure;
    a second strip trench structure formed on the semiconductor substrate, a first end of the second strip trench structure running through the second surface of the first reflecting trench structure to connect with the first reflecting trench structure, and the thin film disposed on the second strip trench structure;
    a second light source unit disposed on the semiconductor substrate and the position of the second light source unit corresponding to the second reflector, for converting the second electrical signal into a second corresponding optical signal; and
    a second optical waveguide structure formed in the second strip trench structure and extending to the second reflector;
    wherein the second corresponding optical signal provided by the second light source unit is directed into the second optical waveguide structure, reflected by the second reflector, and transmitted along the second optical waveguide structure to be outputted in sequence.

9. The optical coupler module according to claim 1, wherein the optical coupler module is adapted to transmit and convert a first optical signal, and the optical coupler module comprises:
    a second reflector formed on the slant surface of the first reflecting trench structure;
    a second strip trench structure formed on the semiconductor substrate, a first end of the second strip trench structure running through the second surface of the first reflecting trench structure to connect with the first reflecting trench structure, and the thin film disposed on the second strip trench structure;

a first light detection unit disposed on the semiconductor substrate, and the position of the first light detection unit corresponding to the second reflector, for converting the first optical signal into a first corresponding electrical signal; and a second optical waveguide structure formed in the second strip trench structure and extending to the second reflector;

wherein the first optical signal is inputted and directed into the second optical waveguide structure, transmitted along the second optical waveguide structure, and reflected by the second reflector to reach the first light detection unit in sequence.

10. The optical coupler module according to claim 1, wherein the optical coupler module is adapted to transmit and convert a first optical signal, and the optical coupler module comprises:

a second reflecting trench structure formed on the semiconductor substrate and defined by two surfaces, and the thin film disposed on the second reflecting trench structure;

a second reflector formed on a first one of the surfaces of the second reflecting trench structure;

a second strip trench structure formed on the semiconductor substrate, a first end of the second strip trench structure running through a second one of the surfaces of the second reflecting trench structure to connect with the second reflecting trench structure, and the thin film disposed on the second strip trench structure;

a first light detection unit disposed on the semiconductor substrate, and the position of the first light detection unit corresponding to the second reflector, for converting the first optical signal into a first corresponding electrical signal; and a second optical waveguide structure formed in the second strip trench structure and extending to the second reflector;

wherein the first optical signal is inputted and directed into the second optical waveguide structure, transmitted along the second optical wave guide structure, and reflected by the second reflector to reach the first light detection unit in sequence.

11. The optical coupler module according to claim 1, wherein the optical coupler module comprises:

a monitor photodiode unit; and a branching optical waveguide structure extending from the first optical waveguide structure to the monitor photodiode unit;

wherein the monitor photodiode unit detects a portion of the first corresponding optical signal received from the first optical waveguide structure via the branching optical waveguide structure.

12. An optical coupler module adapted to be applied on a print circuit board for converting and transmitting a first optical signal, the optical coupler module comprising:

a semiconductor substrate disposed on the print circuit board;

a first reflecting trench structure formed on the semiconductor substrate and defined by two surfaces wherein a first one of the surface is a slant surface;

a first reflector formed on the slant surface of the first reflecting trench structure;

a first strip trench structure formed on the semiconductor substrate, a first end of the first strip trench structure running through a second one of the surfaces of the first reflecting trench structure to connect with the first reflecting trench structure;

a thin film disposed on the semiconductor substrate, the first reflecting trench structure and the first strip trench structure, wherein the thin film is a dielectric layer;

a first light detection unit disposed on the semiconductor substrate and the position of the first light detection unit corresponding to the first reflector, for converting the first optical signal into a first corresponding electrical signal;

a first optical waveguide structure formed in the first strip trench structure and extending to the first reflector; and a coupling unit disposed on the print circuit board and surrounding portions of surfaces of the semiconductor substrate for coupling the optical coupler module to an adapter;

wherein the first optical signal is inputted and directed into the first optical waveguide structure, transmitted along the first optical waveguide structure, and reflected by the first reflector to reach the first light detection unit in sequence; as well as a refractive index of the thin film is less than that of the first optical waveguide structure so that the first corresponding optical signal is transmitted in the first optical waveguide structure with total internal reflection.

13. The optical coupler module according to claim 12, wherein the first light detection unit is a photodiode or a photodetector.

14. The optical coupler module according to claim 12, wherein the optical coupler module comprises:

an electrical transmission unit disposed on the thin film and electrically connected with the first light detection unit, for transmitting the first corresponding electrical signal; and a transimpedance amplifier circuit disposed on the electrical transmission unit, the thin film or the print circuit board, and electrically connected with the electrical transmission unit and the print circuit board, for amplifying the first corresponding electrical signal.

15. The optical coupler module according to claim 12, wherein the optical coupler module comprise:

a second reflecting trench structure formed on the semiconductor substrate and defined by two surfaces, a second end of the first strip trench structure running through a first one of the surfaces of the second reflecting trench structure to connect with the second reflecting trench structure, and the thin film disposed on the second reflecting trench structure; and a second reflector formed on a second one of the surfaces of the second reflecting trench structure;

wherein the coupling unit is mounted beside the semiconductor substrate near the second reflector, and the first optical signal from an optical fiber in the adapter is reflected by the second reflector to be transmitted along the first optical waveguide structure after the coupling unit is connected with the adapter.

16. The optical coupler module according to claim 12, wherein the optical coupler module is adapted to transmit a second optical signal, and the optical coupler module comprises:

a second reflector formed on the slant surface of the first reflecting trench structure;

a second strip trench structure formed on the semiconductor substrate, a first end of the second strip trench structure running through the second surface of the first reflecting trench structure to connect with the first reflecting trench structure, and the thin film disposed on the second strip trench structure;

a second light detection unit disposed on the semiconductor substrate, and the position of the second light detection unit corresponding to the second reflector, for converting the second optical signal into a second corresponding electrical signal; and a second optical waveguide structure formed in the second strip trench structure and extending to the second reflector;

wherein the second optical signal is inputted and directed into the second optical waveguide structure, transmitted along the second optical waveguide structure, and reflected by the second reflector to reach the second light detection unit in sequence.

17. The optical coupler module according to claim 12, wherein the optical coupler module is adapted to transmit and convert a first electrical signal, and the optical coupler module comprises:

a second reflector formed on the slant surface of the first reflecting trench structure;

a second strip trench structure formed on the semiconductor substrate, a first end of the second strip trench structure running through the second surface of the first reflecting trench structure to connect with the first reflecting trench structure, and the thin film disposed on the second strip trench structure;

a first light source unit disposed on the semiconductor substrate, and the position of the first light source unit corresponding to the second reflector, for converting the first electrical signal into a first corresponding optical signal; and a second optical waveguide structure formed in the second strip trench structure and extending to the second reflector;

wherein the first corresponding optical signal provided by the first light source unit is directed into the second optical waveguide structure, reflected by the second reflector, and transmitted along the second optical waveguide structure to be outputted in sequence.

18. An optical coupler module adapted to be applied on a print circuit board for converting and transmit at least one electrical signal or at least one optical signal, the optical coupler module comprising:

a semiconductor substrate disposed on the print circuit board;

at least one strip trench structure formed on the semiconductor substrate, and having a slant surface at one side thereof;

a reflector formed on the slant surface of the strip trench structure;

a thin film disposed on the semiconductor substrate and the strip trench structure, wherein the thin film is a dielectric layer;

at least one signal conversion unit disposed on the semiconductor substrate and the position of the signal conversion unit corresponding to the reflector, for converting the electrical signal into a corresponding optical signal or converting the optical signal into a corresponding electrical signal;

at least one optical waveguide structure formed on the thin film in the strip trench structure; and a coupling unit disposed on the print circuit board and surrounding portions of surfaces of the semiconductor substrate for coupling the optical coupler module to an adapter;

wherein a refractive index of the thin film is less than that of the first optical waveguide structure so that the first corresponding optical signal is transmitted in the first optical waveguide structure with total internal reflection; as well as the corresponding optical signal provided by the signal conversion unit is directed into the optical waveguide structure, reflected by the reflector, and transmitted along the optical waveguide structure to be outputted in sequence; or the optical signal is inputted and directed into the optical waveguide structure, transmitted along the optical waveguide structure, and reflected by the reflector to reach the signal conversion unit in sequence.

* * * * *